United States Patent Office 3,096,697
Patented July 9, 1963

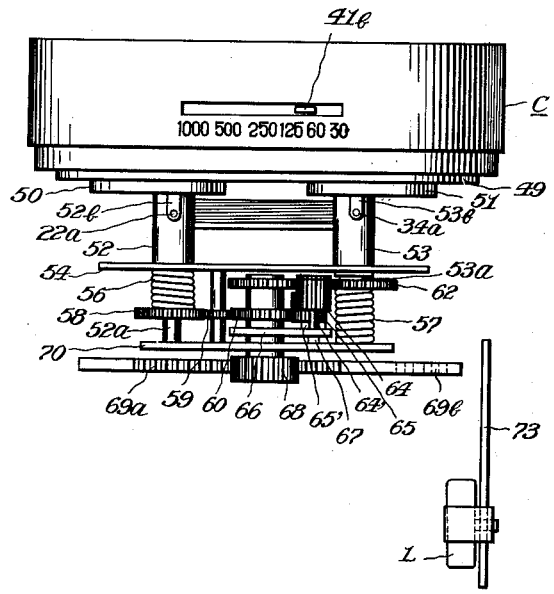

3,096,697
AUTOMATIC SHUTTER FOR CAMERA
Takayoshi Sato and Atsutada Nakatani, both of Tokyo, Japan, assignors to Kabushiki Kaisha Koparu, Tokyo-to, Japan, a joint-stock company of Japan
Filed July 18, 1961, Ser. No. 124,979
3 Claims. (Cl. 95—10)

The present invention relates to an automatic shutter mechanism for cameras, and more particularly to the construction of a photographic shutter including an automatic exposure control mechanism which regulates alternately two exposure elements (that is, the shutter speed and the diaphragm aperture) by means of a differential mechanism actuating said control mechanism, until it is stopped by a stop means which is resting in contact with the pointer of the photoelectric exposure meter built in the camera.

The present invention relates to an improvement of the exposure control mechanism of our copending U.S. application Ser. No. 38,605, filed June 24, 1960, now Patent No. 3,051,064, and more particularly to the construction of an advantageous device.

In our copending application as above-mentioned, upon completion of control of the preset shutter speed by the shutter speed control device, said shutter speed control device unlatches the first lever from the diaphragm aperture control device, and is arrested by the second lever at the same time. Next, the diaphragm aperture control device unlatches the second lever from the shutter speed control device at the end of the control thereof.

In the present invention, two operating levers unlatch successively three latch levers, as follows: The first arm of the first operating lever unlatches the first latch lever from the shutter speed control device, whereby the shutter speed control device begins the control rotation until it is arrested by a gear means provided with a pin, and next, the second arm of said first operating lever unlatches the second latch lever from the diaphragm aperture control device for the control of the diaphragm aperture, and lastly, the third arm of the second operating lever unlatches the third latch lever from a disc means which disengages the shutter speed control means from said arrested position for the purpose of further control thereof.

Thus, since the exposure control mechanism of this invention is constructed by reliable members, the operation thereof is performed surely, and the regulation thereof is very easy, and yet the manufacture thereof is very simple.

An object of this invention is to provide a construction of a photographic shutter including an improved automatic exposure control mechanism in which a diaphragm aperture is automatically controlled in relation to a preset shutter speed by the diaphragm aperture control mechanism, and in which, if the setting for the proper exposure is not completely performed in the control range of the diaphragm aperture control mechanism, the shutter speed control mechanism will start in the control movement from the preset position thereof for the automatic setting of the shutter speed.

Another object of the invention is to provide a construction of an automatic shutter for a camera including a device which enables the manual setting of the shutter speed and the diaphragm aperture.

A further object of the invention is to provide a construction of an automatic shutter for a camera including a bulb operation preventing device, which serves to prevent the bulb operation when the diaphragm setting ring is set in the position of automatic operation.

Said objects and other objects and advantages of this invention will be apparent from the following detailed description, when taken together with the accompanying drawings, in which the same and equivalent members are indicated by the same references and in which:

FIG. 6 is a side elevational view of the differential mechanism which actuates the exposure control mechanism;

Figure 8:
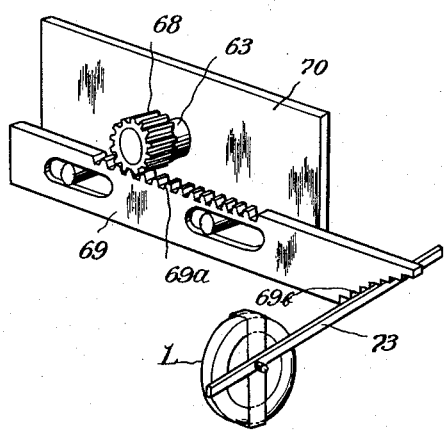

FIG. 7 is a reproduction of FIG. 9 of said copending application, showing a perspective view in which the connection of the exposure control mechanism and the differential mechanism is illustrated, and a partial view of an operating ring is supplemented therein to facilitate an exact understanding of the present invention, and, FIG. 8 is a perspective view showing the engagement of the stop means and the photoelectric exposure meter.

Figure 1:
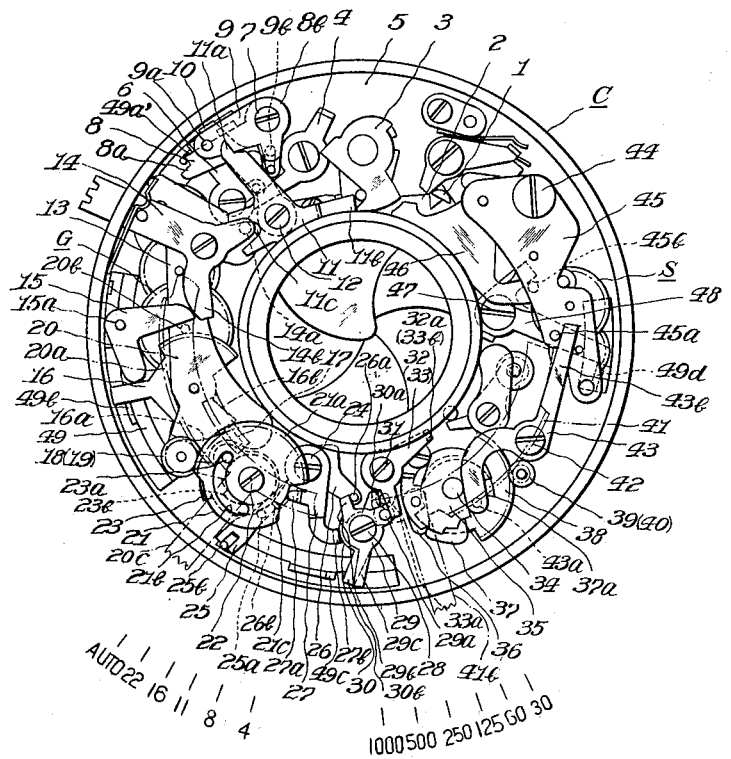
FIG. 1 is a front elevational view of a photographic shutter of this invention, in which an automatic exposure control mechanism is set in the rest position.

Referring to FIG. 1, a notch of a shutter blade actuating lever 2 which is pivoted on a shutter blade driving disc means 3 engages with a post 1 on a shutter blade operating ring (not shown).

Figure 2:
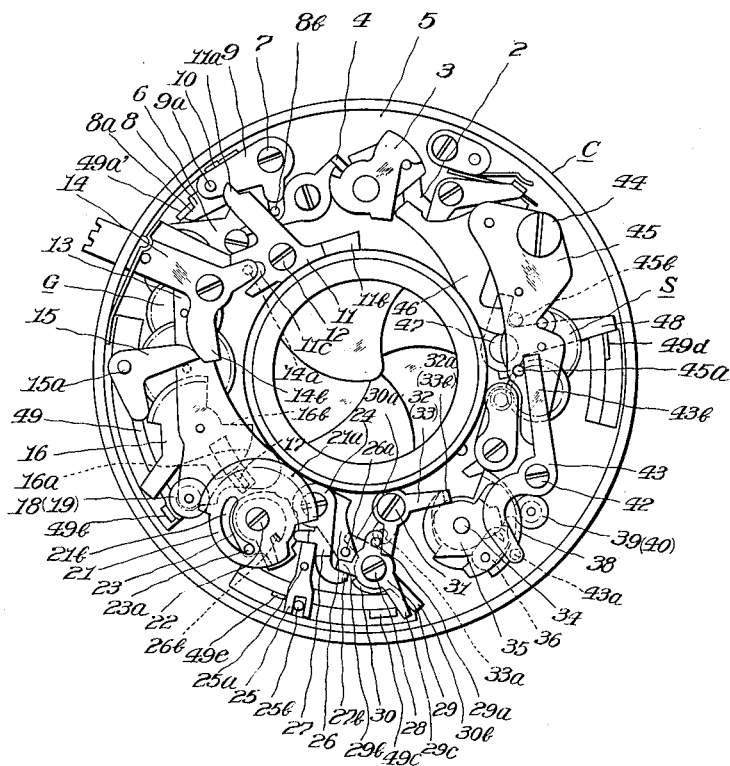
FIG. 2 is a view similar to FIG. 1, in which the automatic exposure control mechanism and a shutter blade driving means are locked in the charged position.

A release lever 4 is pivoted on a shutter base plate 5 and latches the driving disc means 3 in the shutter cocked position as shown in FIG. 2. A lug 49a of an operating ring 49 actuates pivotally a lever 6 which unlatches the release lever 4 from the driving disc means 3. Said ring 49 is mounted rotatably around an optical axis on the outside of the shutter casing C. A checking lever 8 and a bulb operating lever 9 are mounted pivotably around an axis 7 on the base plate 5. Said checking lever 8 is provided with a pin 8b and a step 8a which checks the return rotation of the ring 49, and said bulb operating lever 9 is provided with an upper pin 9a and an under pin 9b. A lever 10 and a bulb lever 11 are pivoted respectively around an axis 12. Said lever 10 is always in contact with said pins 8b and 9b for the counter-clockwise movement of the levers 8 and 9, and said bulb lever 11 has a step 11a, an arm 11b and an arcuate notch 11c.

Figure 4:
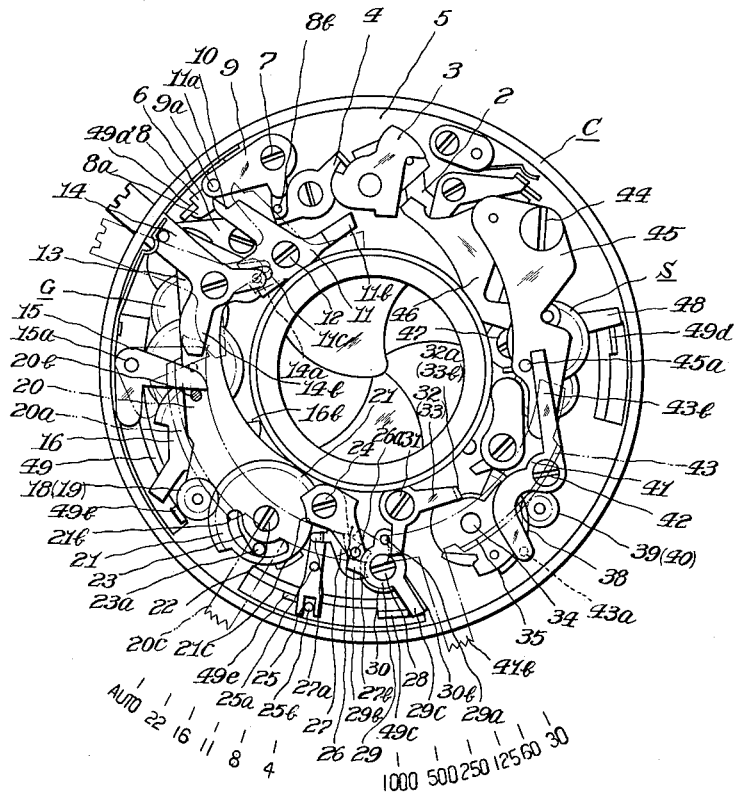
FIG. 4 is a view similar to FIG. 2, in which a diaphragm setting ring is set manually to a desired diaphragm aperture (e.g. f22) in the bulb operation.

A handle lever 14 which can be manually operated at the outside of the shutter casing C, is pivoted on an upper bearing plate 13 of a governor G, and is provided with an under pin 14a and an arm 14b. Said pin 14a engages with the arcuate notch 11c, and said arm 14b contacts a crank lever 15 in the automatic exposure control. Said crank lever 15 which is biased clockwise by a spring (not shown) is mounted securely on an axis 15a which extends through the rear wall of the shutter casing C, to operate switch means for opening a circuit between the photocell and the exposure meter L when the crank lever 15 is positioned as shown in FIG. 4.

The governor G consists of a well known gear train including a segment gear 16 which is biased counterclockwise by a spring (not shown) for delaying the return movement of the operating ring 49 through a lug 49b thereof. Said segment gear 16 has a notch 16b and a verge portion 16a engaging with an upwardly bent lug 17 of the shutter blade operating ring (not shown) in the shutter setting position.

A pinion having two toothed portions 18 and 19 is mounted rotatably around an axis mounted on said governor bearing plate 13b. Said upper toothed portion 18 meshes with a toothed portion 20a of a diaphram setting ring 20, the lower pin 20b of which contacts with the crank lever 15 in an automatic exposure control, and said lower toothed portion 19 meshes with a toothed portion 21a of a diaphragm control disc 21, which is mounted rotatably around a shaft 22 projecting out of the shutter casing C towards the rear direction and has an arcuate slot 21b and a notch 21c. Said diaphragm setting ring 20 is provided with a manually operatable handle 20c. A diaphragm cam means 23, which is fixed around the shaft 22 at the lower portion of said disc 21, is provided with a pin 23a which extends into said arcuate slot 21b.

A diaphragm operating lever 25, which is biased clockwise around a shaft 24 by a spring (not shown), engages with a pin 25b of the diaphragm operating ring (not shown) and is provided with a pin 25a. Said lever 25 is actuated counter-clockwise by a lug 49e of the ring 49 for obtaining the full diaphragm aperture (e.g., f:4). A lever 26 for latching the diaphragm cam means 23 is mounted pivotably on said shaft 24, and is provided with two arms; one of said arms has a pin 26a, and the other has a lug 26b which engages with a rear nose portion 23b of the diaphragm cam means 23. Further, a lever 27 is also mounted pivotably around said shaft 24 and has a projection 27a which comes into contact with the periphery of the diaphragm control disc 21.

Figure 5:
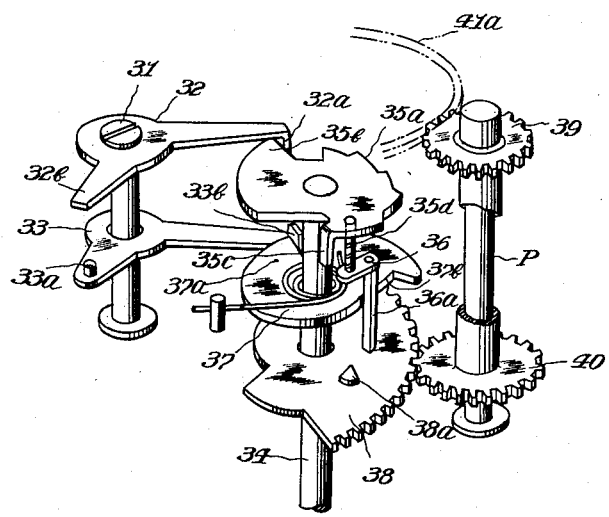
FIG. 5 is a schematic perspective view of a shutter speed control mechanism.

Operating levers 29 and 30 are each mounted pivotably on stud 28. Said first operating lever 29 is provided with a pin 29a and two arms 29b and 29c, and said second operating lever 30 is provided with two arms 30a and 30b. The levers 29 and 30 are rotated counter-clockwise against the respective springs (not shown) by a lug 49c of an operating ring 49 at the shutter setting time. A first and a second hook lever 32 and 33 are mounted respectively on a pivot stud 31. As shown in FIG. 5, said first hook lever 32 is provided with a downwardly bent lug 32a and an arm 32b which engage with the pin 29a of the first operating lever 29, and said second hook lever 33 is provided with an upwardly bent lug 33b and with a pin 33a and engages with the arm 30a of the second operating lever 30.

Figure 3:
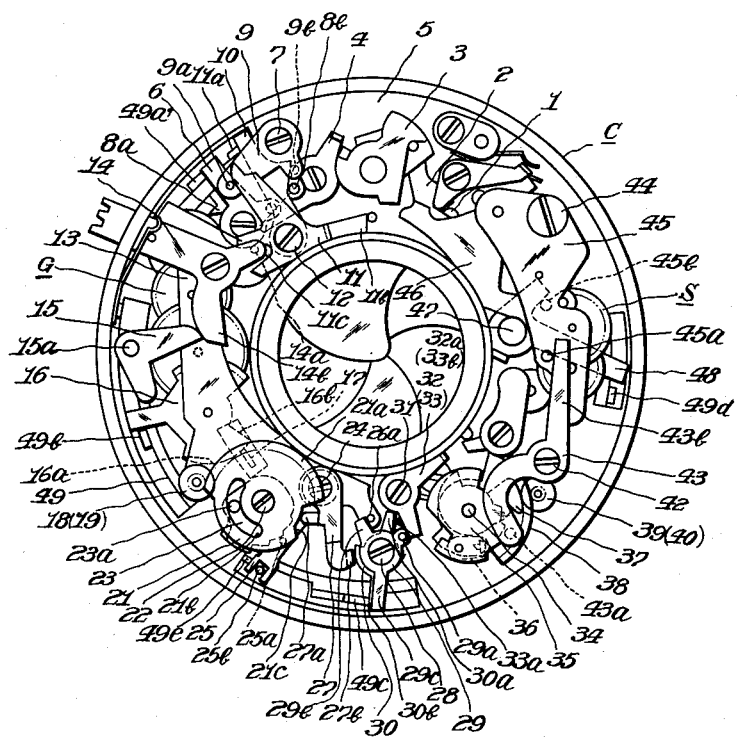
FIG. 3 is a view similar to FIG. 2 in which the automatic exposure control mechanism is in a state of controlling an exposure, in correspondence with the light condition measured by a photoelectric exposure meter, before releasing of the shutter blade driving means.

A shutter speed control cam means 35 is fixed around a shaft 34 which projects out of the shutter casing C toward the camera, and said cam means 35 is provided with a cam stepped portion 35a, a downwardly bent lug 35c, a downwardly extending pin 35d and a nose portion 35b which is hooked by the downwardly bent lug 32a of the first hook lever 32 (as shown in FIG. 5). A lever 36 which is pivoted on said lower pin 35d is provided with pin 36a (as shown in FIG. 5). Further, a disc member 37 and a shutter speed preset gear 38 are mounted rotatably around the shaft 34. A fan-shaped pin 38a on said preset gear 38 stops clockwise rotation of the cam means 35 by its engaging the pin 36a. Said disc member 37 is provided with a nose portion 37a for engaging with the upwardly bent lug 33b of the second hook lever 33, and is provided with a cam surface 37b which disengages the pin 36a from the fan shaped pin 38a when said nose portion 37a is disengaged from the lug 33b, and consequently the cam means 35 starts again the rotation from said stop position as shown in FIG. 3.

A means which is provided with toothed portions 39 and 40 at the two ends thereof, is mounted rotatably around a post P secured on the shutter base plate 5 (as shown in FIG. 5). Said lower toothed portion 40 meshes with the shutter speed preset gear 38, and said upper toothed portion 39 meshes with a gear portion 41a of a shutter speed setting ring 41 which is mounted around the optical axis and has a manually operatable handle 41b.

A lever 43 which is mounted pivotably around a pivotal axis 42 is provided with a downward pin 43a for engaging with the cam stepped portion 35a of the shutter speed control cam means. Said lever 43 is biased counter-clockwise by a spring (not shown). A pin 45a which is engaged with an arm 43b of the lever 43 is fixed on the bearing plate 45 of the shutter speed slow governor S which is mounted pivotably around a pivot axis 44. A crank lever 48 pivoted around an axis 47 on the base plate 5 provides a first arm which engages with a downward pin 45b of the bearing plate 45, and provides a second arm which engages with a lug 49d of the operating ring 49. Said crank lever 48 is biased clockwise by means of a spring thereof (not shown) which is stronger than that of the lever 43. When the crank lever 48 is pivoted counter-clockwise by the lug 49d, the lever 43 displaces clockwise the slow governor S by means of the spring thereof. Consequently, the shutter speed control cam means 35 is rotated counter-clockwise. When the lug 49d disengages from the arm of the lever 48, said lever 48 displaces counter-clockwise the slow governor S against the spring of the lever 43. Consequently, the downward pin 43a of the lever 43 contacts the cam stepped portion 35a of the shutter speed control cam means 35. The delaying time of the shutter speed is determined by the angle displacement of the shutter speed slow governor S which includes a well known lever 46 connected with the gear train.

The control movements of the shutter speed control mechanism and the diaphragm aperture control mechanism are performed, respectively, by a differential gear mechanism connected with the shafts 22 and 34 until the well known stop means is stopped by the pointer of the exposure meter. The differential gear mechanism, which is used in the present invention, is similar to the mechanism shown in our copending U.S. application Ser. No. 38,605, filed June 24, 1960.

This differential gear mechanism actuates alternately the shutter speed control mechanism and the diaphragm aperture control mechanism by a respective driving spring until a stop means comes to rest in contact with the pointer of the exposure meter. The displacement of the stop means corresponds to the degree of exposure detected by the exposure meter, and is transmitted to the differential gear mechanism as a rotational movement.

In FIGS. 6 and 8, a toothed portion 69a of the stop means 69 meshes with a pinion 68 which is fixed on a shaft 63. Said stop means 69 has a stepped cam 69b which comes into contact with the pointer 73 of the exposure meter L built into the camera body when the stop means 69 is actuated by the springs 56 and 57 in the rightward direction.

The differential gear mechanism comprises a plate 66 securely mounted on shaft 63, gears 60 and 61 are rotatably mounted around the shaft 63, pinions 64 and 65 are meshed with each other and respectively meshed with the gears 60 and 61. Said pinions 64 and 65 are respectively rotatable around the pivot shafts 64′ and 65′ which are secured on the plate 66. The gear 58 which is mounted fixedly around a shaft portion 52a of a cylinder 52, meshes with a gear 59 which meshes with the rotatable gear 60. In the same manner, the gear 62 mounted fixedly around a shaft portion 53a of a cylinder 53 meshes with a gear which exists behind the pinion 64 in FIG. 6 and which is mounted rotatably around a shaft 67 meshing with the gear 61. The two ends of an actuating spring 56 are respectively connected with the plate 54 and the shaft 52a, and similarly, the two ends of an actuating spring 57 are respectively connected with the shaft 53a and the plate 70. The cylinders 52 and 53 which are mounted rotatably on both the plates 54 and 70 are respectively connected with the shafts 22 and 34.

The connection of the cylinder 52 and the shaft 22 is shown in FIG. 7. The shaft 22 extends through a center hole of a gear 55 having a projection 55a, and a pin 22a engages with a slot 52b of the cylinder 52. The gear 55 meshes with a toothed member 50 fixed on the operating ring 49. This connection is similar to the connection of the cylinder 53 and the shaft 34. In the clockwise movement of the ring 49, the projection 55a of the gear 55 engages with the pin 22a, and actuates the shaft 22 and the cylinder 52 in the clockwise direction in FIG. 7. Accordingly, the cylinders 52 and 53 are simultaneously rotated by the clockwise rotation of the ring 49. With the above-mentioned movement, the springs 56 and 57 are tensioned. In this case, the differential gear mechanism and the stop means are respectively positioned as shown in FIG. 6.

However, when the ring 49 is returned counterclockwise by a spring (not shown) in the shutter releasing, the cylinders 52 and 53 are alternately rotated with the shafts 22 and 34 by the forces of the springs 56 and 57, until the stop means 69 is stopped by the pointer 73 of the exposure meter L as shown in FIG. 8. For example, when the diaphragm control mechanism is latched together with the cylinder 52 and the gears 58, 59 and 60, the cylinder 53 is rotated, counter-clockwise in FIG. 6 by the driving spring 57, so that the pinions 64 and 65 on the plate 66 are slightly rotated in the counter-clockwise direction around the latched gear 60, until the shutter speed control mechanism is stopped in correspondence with the preset shutter speed. Accordingly, the stop means 69 is actuated in the rightward direction, in FIG. 6, but said means 69 cannot reach the pointer 73.

After the stopping of the cylinder 53 which is connected with the shutter speed control mechanism, the diaphragm aperture control mechanism is unlatched, so that the cylinder 52 is rotated counter-clockwise by the spring 56 together with the gears 58, 59 and 60. Accordingly, the pinions 64 and 65 on the plate 66 are further rotated around the latched gear 61 in the counter-clockwise direction until the stop means 69 is stopped by the pointer 73 of the exposure meter L. In this rotation for controlling to a smaller diaphragm aperture, when the stop means 69 has not yet reached the point 73, the cylinder 53 is again rotated from the position corresponding to said preset shutter speed for the controlling to a higher shutter speed by the unlatching of the shutter speed control mechanism. The above mentioned operation takes place in an instant.

In the following disclosure, the operation of the exposure control mechanism of this invention will be described in connection with FIGS. 1 to 5.

When the ring 49 is rotated counter-clockwise from the position in FIG. 1, the cocking operation is simultaneously performed together with the tensioning of the driving disc 3. The segment gear 16 is rotated counter-clockwise by the spring thereof (not shown). The lug 49e shown in FIG. 2 carries the diaphragm operating lever 25 to the position of the maximum diaphragm aperture (e.g., f4). The crank lever 48 is rotated counter-clockwise by the lug 49d, so that the slow governor S is pivoted clockwise about the pivot axis 44 by the spring of the lever 43, and then the pin 43a disengages from the cam stepped portion 35a of the shutter speed control cam means 35. Moreover, operating levers 29 and 30 are rotated counter-clockwise by the lug 49c, so that the latching lever 26 latches on the rear nose portion 23b of the diaphragm control cam means 23, and the hook levers 32 and 33 respectively latch on the nose portions 35b and 37a as shown in FIG. 5. The return movement of the ring 49 is checked by the engaging of the lug 49a' and the step 8a of the checking lever 8. The entire mechanism of this shutter is cocked by the above-mentioned movement of the ring 49.

*Automatic Exposure Control Operation*

In this operation, the diaphragm setting ring 20 is previously set to the Auto position by the handle 20c (as shown in FIG. 1), so that the pin 23a of the diaphragm control cam means 23 can move from end to end in the arcuate slot 21b (that is, the diaphragm aperture is freely adjustable from the maximum to the minimum aperture). Simultaneously, the crank lever 15 is positioned by the lower pin 20b of the ring 20 to the position of FIG. 2 for closing the circuit of the photo-electric exposure meter. Further, the shutter speed setting ring 41 is previously set to the position of the desired shutter speed (e.g., 1/125 second as shown in FIG. 1) by the handle 41b, so that the fan-shaped pin 38a of the preset gear 38 is prepositioned through the toothed portions 39 and 40. The above-mentioned position is shown in FIG. 2.

At the shutter releasing time, the checking lever 8 is actuated in the arrow direction as shown in FIG. 2 by the clockwise movement of the lever 10, so that the lug 49a is disengaged from the step 8a and starts to carry out the return movement due to the spring (not shown). Then, the shutter exposure control is performed, in order, as follows.

The release lever 4 unlatches the driving disc 3 by means of the lever 6 which is pivoted clockwise by the lug 49a. But said driving disc 3 is actuated only slightly since the upwardly bent lug 17 of the shutter blade operating ring (not shown) engages slidably with the verge portion 16a of the segment gear 16.

When the levers 29 and 30 rotate clockwise with the retreat of the lug 49c, the levers 32, 26 and 33, respectively, are unlatched, in order, from the nose portions 35b, 23b and 37a by the pin 29a, and the arms 29b and 30a.

At first, when the lever 32 is unlatched from the cam means 35 by the pin 29a, the shutter speed control cam means 35 is rotated clockwise by the spring 57 together with the shaft 34 connected with the cylinder 53, until the pin 36a of the lever 36 which is pivoted around the lower pin 35d of the cam means 35 is stopped by the fan-shaped pin 38a of the preset gear 38. At the same time, the slow governor S is rotated counter-clockwise by the crank lever 48 which is biased clockwise by a spring (not shown), until the pin 43a of the lever 43 engages with the cam stepped portion 35a of the cam means 35. In the above-mentioned operation, the shutter speed control mechanism is set in the preset position of the gear 38.

After the stopping of the cam means 35, the latching lever 26 is disengaged from the nose portion 23b of the diaphragm control cam means 23 by the arm 29b of the lever 29. Accordingly, the diaphragm aperture control cam means 23 is rotated clockwise together with the shaft 22 by the spring 56 until the stop means 59 is stopped by the pointer 73. The diaphragm operating lever 25 determines the diaphragm aperture by means of the engagement between the pin 25a and the diaphragm cam means 23.

After control of the diaphragm aperture, the hook lever 33 is unlatched from the nose portion 37a of the disc member 37 by the arm 30a of the lever 30, so that the disc member 37 is moved clockwise by the spring thereof as shown in FIG. 5. Accordingly, the cam surface 37b of the disc member 37 disengages the pin 36a from the fan-shaped pin 38a. In the above-mentioned control of the diaphragm aperture control cam means 23, if the stop means 59 is stopped by the pointer 73 within the control range of the diaphragm aperture (e.g., f4 to f22), said shutter speed control cam means 35 will not be rotated. However, if the stop means 59 is not yet stopped by the pointer 73, the cam means 35 will be rotated again by the spring 57 in the clockwise direction until the stop means 59 is stopped by the pointer 73. Thus, the exposure control mechanism is set in accordance with the light value measured by the photoelectric exposure meter L.

During the above operation of the exposure control mechanism, the governor G delays the return movement of the ring 49 so as to accomplish positively said control operation. After the entire above operation, the upwardly bent lug 17 of the shutter blade operating ring disengages from the verge portion 16a of the segment gear 16, so that the shutter blade driving disc means 3 actuates the shutter blade in the well known manner.

*Manual Exposure Control Operation*

In this case, the diaphragm setting ring 20 is set in the desired diaphragm aperture setting position (e.g., f22 as shown in FIG. 4, but a bulb operating device takes the position shown by the broken line), and then the crank lever 15 is rotated clockwise by the spring thereof for the opening of the photoelectric exposure meter circuit, so that the pointer 73 becomes independent of the stop means 69. At the same time, the diaphragm aperture control disc 21 is slightly rotated in the counter-clockwise direction through the pinion provided with two toothed portions 18 and 19. Accordingly, the rotational angle of the diaphragm aperture control disc 21 is limited in accordance with the manually set diaphragm aperture, and the lever 27 is pivoted counter-clockwise for checking the rotation of the second operating lever 30 as shown in FIG. 4, so that the shutter speed control cam means 35 is set in the preset position without the second rotation.

At the shutter releasing time, therefore, the first operating lever 29 is rotated clockwise, but the second operating lever 30 is not rotated. Accordingly, the pin 36a is stopped by the prepositioned fan-shaped pin 38a, and the pin 23a of the diaphragm control disc 23 is stopped by the end of the arcuate slot 21b after rotation through the predetermined angle. After the above exposure control, the shutter blade driving disc means 3 actuates the shutter blades.

In the bulb operation of the shutter blades, the handle lever 14 is positioned by hand as shown in FIG. 4, so that the bulb lever 11 is pivoted counter-clockwise around the axis 12. Accordingly, the pin 9a of the bulb operating lever 9 engages with the step 11a of the bulb lever 11 at the shutter blade releasing time, and the arm 11b checks the rotation of the disc means 3 in the position corresponding to the shutter blade full opening.

Exchange from the manual operation to the automatic operation is accomplished by the diaphragm setting ring 20, of which the handle 20c is brought by hand in the Auto position. The crank lever 15 is rotated counter-clockwise by the pin 20b of the diaphragm setting ring 20, and brings the unillustrated circuit of the photoelectric exposure meter into the operating state. Consequently, the pointer 73 swings within the movable range of the stop means 69.

In the above adjustment, even if the handle lever 14 is set in the bulb operating position, said handle lever 14 will be pivoted in the position shown in FIG. 2 by the crank lever 15. Accordingly, the bulb operation will not occur absolutely during Auto setting time.

It will be understood that the embodiment as above described is variously modifiable in order to adapt it to different usages. We desire, therefore, such modifications to be comprehended in this invention within the scope of the appended claims.

What we claim is:

1. In a photographic lens shutter including a shutter release, shutter cocking means, and an automatic exposure control mechanism in which a shutter speed control means including a shutter, a shutter governor and a diaphragm aperture control means are actuated in sequence by a differential mechanism including two elements for controlling a respective exposure element, and a stop means connected with said differential mechanism adapted to be stopped in correspondence with the light condition measured by a photoelectric exposure meter built in the camera; the combination in said automatic exposure control mechanism comprising a diaphragm operating lever operated upon operation of the shutter release, a diaphragm aperture control cam means provided with a first nose portion and a first cam step portion adapted to be positioned to determine the diaphragm aperture, said diaphragm control cam means being connected with one element of said differential mechanism, a first latch lever for engaging said first nose portion to prevent movement of said one element of said differential mechanism in the shutter cocked position, a shutter speed control cam means provided with a second nose portion and a second cam step portion for adjusting the shutter governor, said shutter speed control cam means being connected with the second element of said differential mechanism, an operating lever means connecting said shutter speed control cam means to said governor, a second latch lever capable of being engaged with said second nose portion to prevent movement of said differential mechanism in the shutter cocked position, a first pivoted lever associated with said shutter speed control cam means and provided with a first pin, a spur gear provided with an arresting pin adapted to arrest said first pin for stopping the rotation of said shutter speed control cam means, a shutter speed preset means capable of displacing the arresting pin on said spur gear to a position corresponding to a desired shutter speed, a disengaging disc provided with a third nose portion and a cam surface for disengaging said first pin from said arresting pin upon release of the shutter, a third latch lever capable of being engaged with said third nose portion against a spring of said disc, a first unlatch lever provided with first and second arms, and a second unlatch lever provided with a third arm, said two unlatch levers actuating to unlatch one by one said three latch levers from the respective nose portions for controlling the shutter speed and the diaphragm aperture control devices.

2. The shutter construction as defined in claim 1, in which a manual exposure setting means is provided which comprises a manually adjustable diaphragm aperture setting ring movable from an Auto setting position to a desired diaphragm aperture setting position, a switching means constructed as a crank lever which is rotated in accordance with said manual adjustment of said diaphragm aperture setting ring, means for opening a circuit of the photoelectric exposure meter operated by said aperture setting ring, a first pin mounted on said setting ring for closing the circuit of said meter when said setting ring is adjusted to the Auto setting position, a second pin on said diaphragm aperture control cam means, a stop gear adjusted by said setting ring through a pinion provided with a cam notch and an arcuate slot for receiving said second pin, and a checking lever engaged by said cam notch of said stop gear for checking said unlatching of said second unlatch lever in the manual operation, whereby the control rotation of the shutter speed control cam means is stopped by said arersting pin in accordance with the shutter speed which is preset by said shutter speed preset means, and the control rotation of the diaphragm aperture control cam means is stopped by the engagement of said second pin and the end of said slot in accordance with the desired diaphragm aperture.

3. The shutter construction as defined in claim 2, in which a device is provided which prevents the bulb operation when the shuter is set in the Auto setting, said device comprising a bulb setting lever capable of setting the bulb operation in the manual setting and provided with a fourth arm, and a third pin on said diaphragm setting ring for operating said fourth arm through said crank lever when said diaphragm setting ring is set in the Auto setting position, whereby said bulb setting lever is pivoted to the bulb unoperating position.

References Cited in the file of this patent

UNITED STATES PATENTS

| | | |
|---|---|---|
| 2,780,971 | Fahlenberg | Feb. 12, 1957 |
| 2,913,969 | Faulhaber | Nov. 24, 1959 |
| 2,925,760 | Broschke | Feb. 13, 1960 |
| 3,000,282 | Noack | Sept. 19, 1961 |